United States Patent [19]

Uttke et al.

[11] Patent Number: 5,188,214

[45] Date of Patent: * Feb. 23, 1993

[54] END SEAL FOR IDLER ROLLER

[75] Inventors: Russell H. C. Uttke; Edward J. Carney, both of Greendale, Wis.

[73] Assignee: Rexnord Corporation, Milwaukee, Wis.

[*] Notice: The portion of the term of this patent subsequent to Nov. 27, 2007 has been disclaimed.

[21] Appl. No.: 586,558

[22] Filed: Sep. 21, 1990

Related U.S. Application Data

[63] Continuation of Ser. No. 433,420, Nov. 7, 1989, Pat. No. 4,972,939, and a continuation of Ser. No. 187,473, Apr. 28, 1988, abandoned.

[51] Int. Cl.$^5$ .............................................. B65G 39/00
[52] U.S. Cl. .................................... 198/501; 198/842; 384/480
[58] Field of Search ................. 193/37; 198/501, 842; 277/57; 384/480, 144

[56] References Cited

U.S. PATENT DOCUMENTS

| | | | |
|---|---|---|---|
| 3,157,272 | 11/1964 | Bay | 198/842 |
| 3,198,318 | 8/1965 | Brown | 384/480 |
| 3,332,536 | 7/1967 | Ebly et al. | 198/501 |
| 3,338,381 | 8/1967 | Imse | 198/501 |
| 3,892,306 | 7/1975 | Bertaud | 198/501 |
| 3,984,160 | 10/1976 | Sheldon et al. | 308/187.1 |
| 4,174,031 | 11/1979 | Macleod | 198/501 |
| 4,277,114 | 7/1981 | Lindegger | 384/480 X |
| 4,344,218 | 8/1982 | Hooper et al. | 198/842 X |
| 4,643,300 | 2/1987 | Morrison | 198/842 |
| 4,919,253 | 4/1990 | Morrison | 198/501 |

FOREIGN PATENT DOCUMENTS

| | | | |
|---|---|---|---|
| 1039837 | 9/1983 | U.S.S.R. | 198/842 |
| 2041111 | 9/1980 | United Kingdom | 277/57 |

Primary Examiner—D. Glenn Dayoan
Assistant Examiner—Cheryl L. Gastineau
Attorney, Agent, or Firm—Michael, Best & Friedrich

[57] ABSTRACT

A multi-roller conveyor includes a plurality of idler rollers journaled for rotation around individual, stationary shafts. Each roller includes, at each of its ends, a metal end plate and an end bearing, received in the end plate, for rotatably supporting the roller relative to the shaft. To protect against the entry of contaminants, an end seal assembly, including an inner seal member mounted to the roller, and an outer seal member, mounted to the stationary shaft, is provided at each end of the roller. The inner and outer seal members are formed of molded plastic and co-operate with each other, and with the roller end plate, to form a labyrinth-like passageway leading from the end bearing to the exterior of the roller. The outer seal further includes a metallic nut for facilitating mounting to the stationary shaft. In addition, the dimensions of the roller end plate adjacent the outer seal member are carefully controlled to reduce the clearance between the outer seal member and the end plate and thereby further guard against the entry of contaminants.

4 Claims, 2 Drawing Sheets

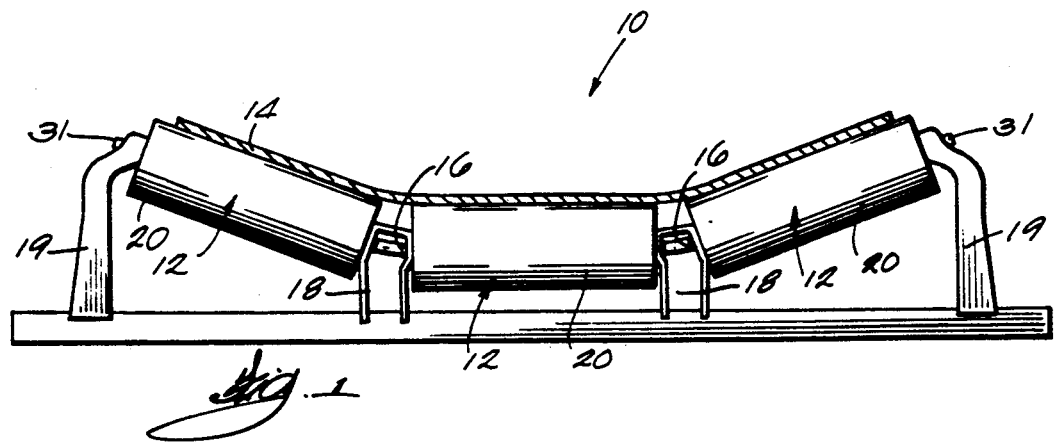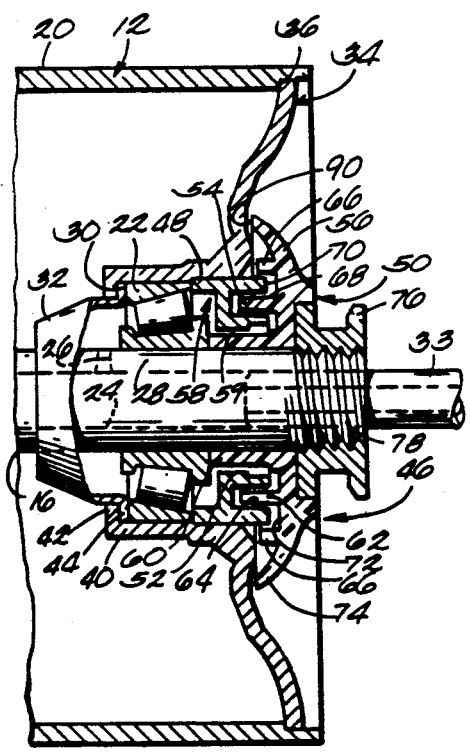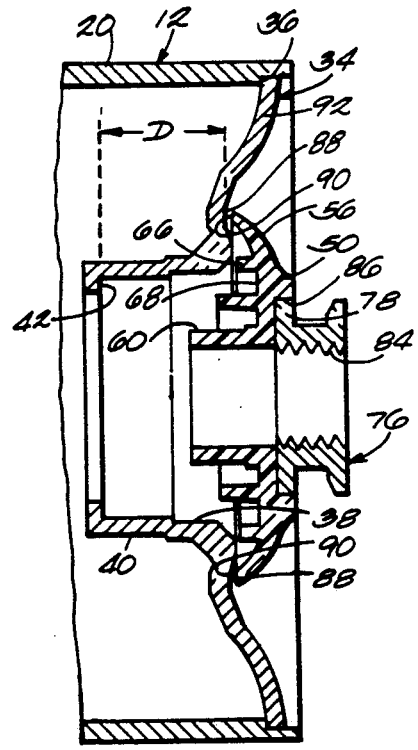

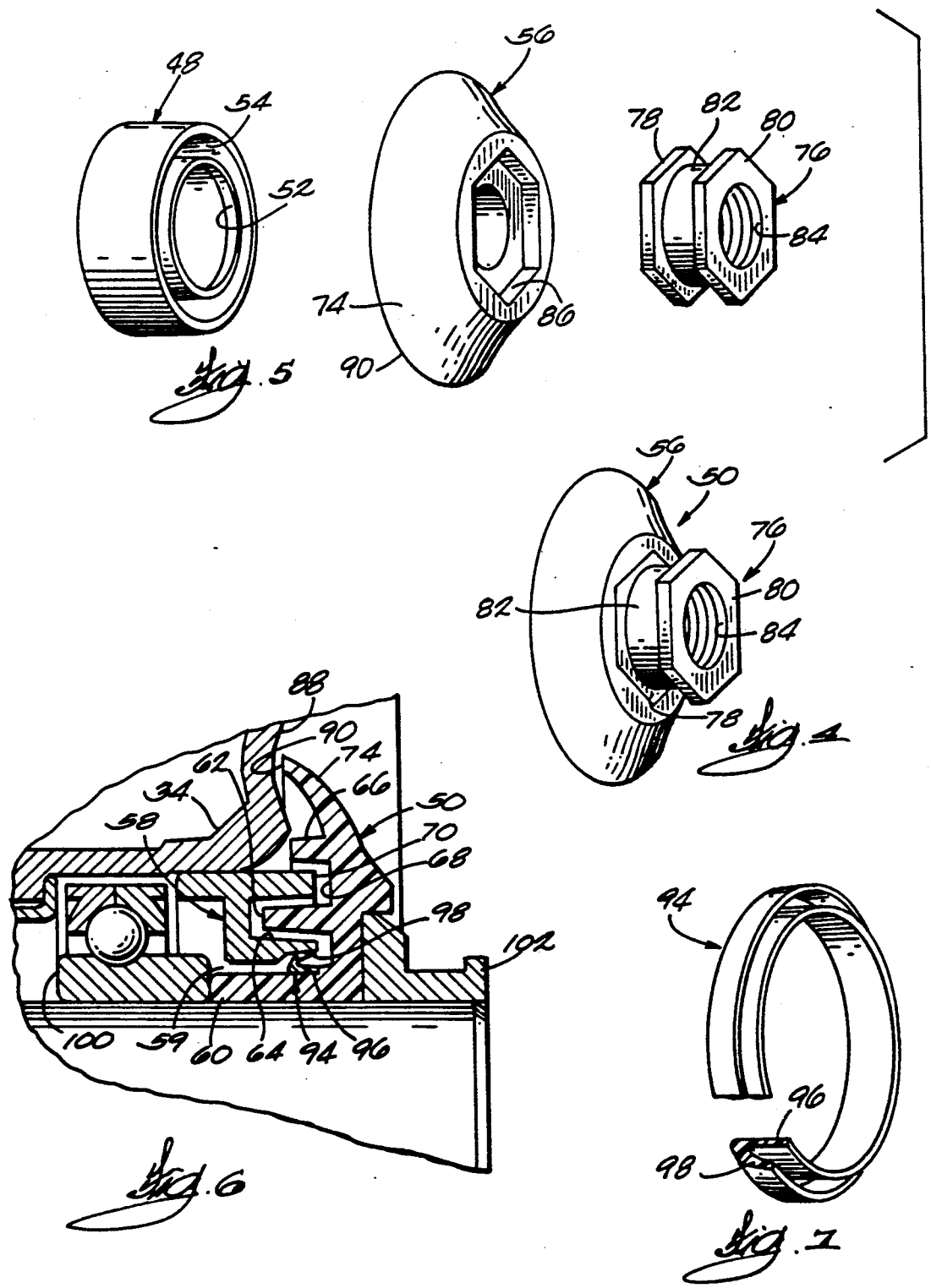

5,188,214

END SEAL FOR IDLER ROLLER

This is a continuation of co-pending U.S. patent application Ser. No. 433,420 filed Nov. 7, 1989 issued on Nov. 27, 1990 as U.S. Pat. No. 4,972,939, a continuation of U.S. patent application Ser. No. 187,473, filed Apr. 28, 1988 and now abandoned.

BACKGROUND OF THE INVENTION

This invention relates generally to idler rollers for conveyors and, more particularly, to idler end seals for end bearings in such idler rollers.

Labyrinth-type end seals, for use in conveyor roller assemblies, are well-known in the art and are shown, for example, in U.S. Pat. No. 3,984,160 to Sheldon et al., U.S. Pat. No. 4,174,031 to MacLeod, and U.S. Pat. No. 3,892,306 to Bertaud. Generally, such end seals seek to minimize the entry of abrasive dust and contaminants into the idler roller bearings by forming a tortuous path between the bearings and the outside environment.

Other end seal arrangements are shown, for example, in U.S. Pat. No. 3,338,381 to Imse and U.S. Pat. No. 3,332,536 to Ebly et al. In these arrangements, a cap-like shield extends over the end bearings to minimize the entry of abrasive dust, water or other contaminants.

SUMMARY OF THE INVENTION

The invention provides an idler roller including a stationary shaft and a roller body journaled for rotation around the shaft, the roller including an end plate or disc having a central aperture, the end disc being mounted adjacent an end of the roller body. The idler roller also includes an end seal assembly having an inner seal member housed in the central aperture of the end disc and rotatable with the roller body. A stationary outer seal member is supported by the stationary shaft to mate with or co-operate with the inner seal member. The outer seal member includes a recess and a metallic nut fixedly housed in the recess, the nut being adapted to engage an end of the stationary shaft so as to retain the outer end seal member to the stationary shaft and in position over the inner end seal member.

The invention also provides an end seal assembly for use with an idler roller including a shaft and a roller body journaled for rotation around the shaft. The end seal assembly comprises an outer seal member mounted to the shaft and including an outer peripheral edge. An end plate is mounted on one end of the roller body and encircles the shaft. The end plate includes an annular coined region disposed substantially concentrically with the outer peripheral edge of the outer end seal member in closely spaced relationship thereto. The end seal assembly further includes an inner seal member mounted to the end plate within the boundary of the annular coined region and adapted to rotate with the roller body relative to the shaft. The inner and outer seal members are adapted to rotate relative to each other and to form, in conjunction with each other and with the end plate, a labyrinth-like passageway extending from the interface between the outer peripheral edge and the annular coined region to the interface between the inner seal member and the shaft.

The invention also provides a method of manufacturing an outer end seal member of an end seal assembly which is adapted for use with an idler roller including a shaft and a roller body journaled for rotation around the shaft. The method comprises the steps of forming a polygonally-shaped, metallic connector adapted to engage the shaft, molding a heated thermoplastic material to form a substantially disk-shaped shield member having therein formed a polygonally-shaped recess dimensioned to receive closely the metallic connector, and inserting the metallic connector into the recess before the thermoplastic material has fully cooled so that the thermoplastic material shrinks around the metallic connector as it cools to lock securely the metallic connector to the shield member.

The invention also provides a method of forming an end plate for use in an idler roller having a roller body journaled for rotation around a stationary shaft. The method comprises the steps of forming an annularly shaped metallic end plate blank having a substantially circular center aperture formed therein, forming the end plate blank into a substantially funnel-shaped structure including a substantially radially extending bell portion and a substantially cylindrically shaped, axially extending cup portion adjoining the bell portion around the circular center aperture, and coining a substantially annular region in the bell portion around and substantially concentric with the circular center aperture.

It is a principal feature of the present invention to provide an idler end seal which is effective to shield an end bearing in an idler roller against the entry of water and debris.

It is another principal feature of the present invention to provide an idler end seal which is adapted for use in conveyor systems carrying coal, crushed rock, or other materials generating abrasive or non-abrasive, airborne dust.

It is another principal feature of the present invention to provide an idler end seal which can be economically manufactured, installed and maintained in a multiple roller conveyor system.

It is still another principal feature of the present invention to provide a method of manufacturing such an idler end seal.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 1 is a side-elevation view of an idler roller assembly for use in a conveyor and embodying the invention.

FIG. 2 is a partial cross-section view of a portion of an idler roller assembly shown in FIG. 1.

FIG. 3 is a cross-section view, similar to FIG. 2, useful in understanding the manufacture of various elements of the idler end seal.

FIG. 4 is a perspective view of an outer seal member constructed in accordance with one aspect of the invention.

FIG. 5 is an exploded perspective view of the outer seal member illustrated in FIG. 4 in combination with an inner labyrinth seal.

FIG. 6 is an enlarged, fragmentary, cross-section view, similar to FIGS. 2 and 3, showing an alternative embodiment of the idler seal including a plastic wiper ring.

FIG. 7 is a perspective view, partially in section, of the wiper ring included in the embodiment illustrated in FIG. 6.

DESCRIPTION OF THE PREFERRED EMBODIMENT

Referring to the drawings, a idler roller assembly 10 is illustrated in FIG. 1 and includes a plurality of idler rollers 12 arranged to support a conveyor belt 14. As shown, the idler rollers 12 are arranged so as to impart a trough-like shape to the conveyor belt 14 and thereby render the conveyor 10 well-suited for conveying relatively heavy, abrasive materials such as crushed rock, gravel or coal. Each of the idler rollers 12 is journaled for rotation around a stationary shaft 16 mounted between the ends of opposed center and end brackets 18 and 19 respectively.

In accordance with conventional practice, each of the idler rollers 12 includes a cylindrical roller body or shell 20 journaled for rotation around the shaft 16. Bearings 22 (FIG. 2) are mounted on the ends of the stationary shafts 16 and support the opposite ends of idler rollers 12 for rotation around the stationary shafts. While in the illustrated arrangement the bearings 22 are shown as being roller bearings, in other arrangements the bearings 22 can be ball bearings or the like (FIG. 6). In order to permit lubrication of the roller end bearings 22, each of the stationary shafts 16 includes a hollow interior 24 and an outwardly extending, radially directed passageway 26 communicating with the hollow interior 24 through the sidewall 28 of the shaft 16 at a point adjacent the inner end 30 of each bearing 22. A lubrication fitting 31 is fitted to at least one end of the idler roller assembly 10 and communicates with the hollow interiors of the shafts 16. Preferably, the idler roller assembly 10 is arranged to be lubricated from either end. Lubrication tubes 33 interconnect the hollow interiors of adjacent shafts. A flexible grease seal 32, mounted for co-rotation with the roller body 20, surrounds the shaft 16 at a point spaced inwardly of the end bearing 22 and radial passageway 26 to form an enclosed space. Lubricating grease, forced through the lubrication fitting 16, the hollow interior 24 of the shaft 16 and the radial passageway 26, fills the space formed by seal 32 to assure adequate lubrication of the end bearing 22.

As best illustrated in FIGS. 2 and 3, each of the idler rollers 12 includes, at its opposite ends, a concave, substantially disk-shaped end plate or disc 34. Preferably, an annular ledge 36 is formed at each end of each roller body 20, and each end plate 34 is pressed into an end of the roller body 20 so as to engage the annular ledge 36. A central aperture 38 is formed at the center of each end plate 34 so as to permit the shaft 16 to extend therethrough. In addition, an inwardly extending, substantially cylindrical tube, cup or collar portion 40 is integrally formed around the central aperture 38 so as to form a cylindrical enclosure in which each of the end bearings 22 can be received. Preferably, an inwardly turned lip 42 defining an annular surface is formed adjacent the innermost end of the collar portion 40 so as to provide a positive stop against which the inner end 30 of the end bearing 22 can bear. As best seen in FIG. 2, an outwardly turned lip 44 is formed adjacent the outer end of the grease seal 32 and is pinched between the end bearing 22 and the inwardly turned lip 42 of the end plate collar portion so as to affix the grease seal 32 for co-rotation with the idler roller 12.

To prevent the entry of water, abrasive dust or other foreign material into the end bearings 22, an idler end seal assembly 46, embodying various features of the invention, is provided at the ends of each idler roller 12. As best seen in FIGS. 2 and 5, each idler end seal assembly 46 includes an inner seal member 48 received in the roller end plate 34, and an outer seal member 50 stationarily mounted relative to the stationary shaft 16 and co-operating with the inner end seal member 48.

The inner end seal member 48 is preferably formed of a durable, rigid, molded thermo-plastic material and is substantially cylindrical in form. As shown, the inner seal member 48 is received in the collar or cup portion 40 of the end plate 34 adjacent the outer end of the idler end bearing 22. Preferably, the inner seal member 48 is dimensioned for a tight press-fit into the end plate 34 so as to be co-rotatable with the idler roller 12. A central aperture 52, providing clearance for the relatively stationary shaft 16, is formed through the inner seal member 48. In addition, an annular groove 54 is formed in the outer face of the inner seal member 48.

The outer seal member 50 is also formed, in part, of a durable, rigid, molded thermo-plastic material and includes a shield portion 56 which is substantially disk-shaped in form. In order to provide high strength useful in resisting the stresses created as the various seal members are assembled with the remaining components of the idler roller 12, the shield portion 56 of the outer seal member 50 and the inner seal member 48 are preferably formed of a glass fiber reinforced polyester such as polybutylene teraphthlate (PBT). The shield portion 56 of the outer end seal member 50 is dimensioned to extend over and beyond both the inner seal member 48 and the collar portion 40 of the end plate 34 and further includes an inner surface which is shaped to form, in conjunction with the inner end seal member 48, a labyrinth-like passageway 58 communicating with the end bearing 22. To this end, the outer seal member 50 includes an inner tubular portion 60 dimensioned to fit tightly against the relatively stationary shaft 16 within the central aperture 52 of the inner end seal member 48, and the dimensions of both the inner tubular portion 60 and the central aperture 52 of the inner seal member 48 are such that definite clearance 59 is maintained between the inner tubular portion 60 and the inner end seal member 48.

Disposed concentrically around the inner tubular portion 60, the outer seal member 50 includes a first axially projecting annular flange 62 dimensioned to be received within the annular groove 54 formed in the outer face of the inner seal member 48. As illustrated, the dimensions of the groove 54 and the annular flange 62 are such that definite clearance is maintained between the side and end walls of the groove 54 and the side and end walls of the flange 62 so as to form additional clearance 64 communicating with the clearance 59 provided between the inner tubular portion 60 and the inner end seal member 48. Disposed concentrically around the first projecting annular flange 62, the outer seal member 50 includes a second axially projecting annular flange 66 forming, in conjunction with the first projecting flange 62, an annular groove 68 located and dimensioned to receive the outer edge 70 of the inner end seal member 48. Once again, the dimensions of both the groove 68 and the outer edge 70 of the inner end seal member 48 are such that additional clearance 72 is provided to thus form a part of the passageway 58 extending to the end bearing 22.

Beyond the second projecting annular flange 66, the outer seal member 50 further includes a peripheral flange portion 74 which curves toward, and terminates closely adjacent, the idler roller end plate 34. The end plate 34 and the outer peripheral flange portion 74 are dimensioned so that the previously described passageway 58 continues to the exterior of the idler roller 12. Because the inner and outer seal members 48 and 50 are substantially symmetrical around the longitudinal axis of the relatively stationary shaft 16, the labyrinth-like passageway 58 extends from the interface of the inner end seal member 48 and the end bearing 22 to the exterior of the idler roller 12, and is maintained as the idler roller 12 and rotates around the relatively stationary shaft 16.

The outer seal member 50 is rigidly mounted to the relatively stationary shaft 16 by means of a metallic nut 76 preferably threadedly engaging a threaded region 78 formed on the relatively stationary shaft 16 adjacent the end of the idler roller 12. As best seen in FIG. 5, the metallic nut 76 preferably includes an inner hexagonal portion 78, an outer hexagonal portion 80 and an integrally formed substantially cylindrical region 82 separating the two, although it will be appreciated that the nut 76 can be of other than hexagonal configuration and can include, for example, only two flat surfaces. In addition, the metallic nut 76 includes an internally threaded aperture 84 extending axially from one end of the nut to the other. Alternatively, the nut can be press fit onto the end of the shaft 16 as described in reference to FIG. 6 below. Additionally, while in the illustrated arrangement the shaft 16 is shown as a hollow shaft, in other embodiments the shaft 16 could be a solid shaft.

During manufacture, the plastic or shield portion 56 of the outer end seal member 50 is molded so as to include, at its outermost end, a polygonal, preferably hexagonal recess 86 dimensioned to closely receive the inner hexagonal portion 78 of the metallic nut 76. Before the plastic or shield portion 56 of the outer end seal member 50 has fully cooled or become set, it is removed from the mold and the inner hexagonal portion 78 of the nut 76 is quickly inserted into the hexagonal recess 86. Further cooling of the plastic portion causes the plastic to contract tightly around the nut 76 and thereby firmly secure or lock the metallic nut 76 to the plastic portion of the outer end seal member 50. By utilizing a metallic nut 76 in combination with the molded plastic shield portion 56, the manufacturing economy associated with molded plastic parts can be obtained in combination with the superior strength and durability provided by metallic components where the outer end seal member 50 is mounted to the relatively stationary shaft 16. In addition, by inserting the metallic nut 76 into the plastic portion 56 shortly after molding and before the latter has fully cooled, a strong and reliable mechanical bond between the two components can be easily and economically achieved.

In accordance with one aspect of the invention, the entry of contaminants into the area of the end bearing 22 is minimized and controlled by minimizing the clearance between the interface of the outer peripheral flange 74 of the outer end seal member 50 and the idler roller end plate 34. To this end, an annular coined region 88 defining an annular surface is formed in the end plate 34 opposite the outermost edge 90 of the outer peripheral flange portion 74, and the dimensions of the coined region 88 are controlled so as to maintain the coined region in a plane oriented substantially perpendicularly to the longitudinal axis of the relatively stationary shaft 16 and parallel to the plane of the annular surface formed by the lip 42. This helps assure that the gap between the outermost edge 90 of the outer end seal member 50 and the coined region 88 remains substantially constant as the idler roller 12 rotates around the relatively stationary shaft 16. In addition, the dimension D (FIG. 3) between the annular outer surface of the coined region 88 and the annular surface of the inwardly turned lip 42 of the end plate collar portion 40 against which the end bearing 22 rests is also carefully controlled so as to control the amount of clearance between the outer peripheral edge 90 of the outer end seal member 50 and the annular coined region 88.

During manufacture, the end plate 34 is formed by first forming an annularly shaped metallic end plate blank having a substantially circular aperture formed therein. Preferably, the end plate 34 is formed through progressive pressing operations comprising a plurality of separate pressing steps. The annular coined region 88 is preferably given its final shape, during the final pressing step so that its final shape, and the distance between the coined region 88 and the inwardly turned lip 42 of the collar portion 40, can be carefully controlled. Expressed differently, the end plate is formed so that the annular surface formed by the lip 42 lies in a plane oriented perpendicularly to the axis of rotation of the roller, and so that the annular surface of the coined region 88 lies in a plane parallel to the plane of the lip and spaced from that plane by a predetermined distance. By thus forming the end plate 34, carefully controlled tolerances in the gap between the outermost edge 90 of the outer end seal member 50 and the end plate 34 can be achieved.

During operation, lubricating grease, forced through the hollow interior 24 and radial passageway 26 of the stationary shaft 16, fills the end bearing 22 as well as the labyrinth-like passageway formed between the inner and outer end seal members 48 and 50. The narrow gap formed between the outermost edge 90 of the outer seal member 50 and the end plate 34 restricts the entry of foreign matter and helps keep rain or rinse water from washing away the lubricating grease. Periodically, additional lubricating grease can be added through the lubrication fitting 31.

An alternative, non-regreasable embodiment of the invention is illustrated in FIG. 6. In this embodiment, the roller end plate 34, the inner seal member 48 and the outer seal member 50 remain as previously described, and a wiper ring 94, formed of a durable plastic such as Hytrel, is positioned between the inner tubular portion 60 of the outer seal member 50 and the central aperture 52 of the inner end seal member 48. As illustrated in FIG. 7, the wiper ring is substantially annular in form and includes an inner ring portion 96, dimensioned to tightly engage the inner tubular portion 60 of the outer end seal member 50, and an outer ring portion 98 dimensioned to lightly bear against the central aperture 52 of the inner end seal member 48. In place, the wiper ring 94 thus functions to form a barrier along the passageway formed between the inner and outer end seal members 48 and 50 and thus, in conjunction with the grease seal 32 positioned inwardly of the end bearing 100, forms a sealed space surrounding the end bearing 100. Foreign material, passing between the outer end seal member 50 and the end plate 34, is preventing from reaching the end bearing 100. Accordingly, the embodiment illustrated in FIGS. 6 and 7 provides a factory sealed arrangement which provides additional protection against the entry of foreign matter into the end bearings 100.

Although the wiper ring 94 can be incorporated in an idler roller and seal assembly otherwise identical to those shown in FIGS. 1-5, FIG. 6 further illustrates an idler roller wherein the bearing comprises a ball bearing assembly 100 and wherein the outer end seal member 50 includes a metallic connector 102 which is adapted to be press fit, rather than threaded, onto the end of the shaft 16. In this embodiment of the invention, the shaft (not shown) supporting the idler roller can be a solid shaft and the lubrication tubes between idler rollers and the lubrication fittings are eliminated.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

We claim:

1. An idler roller comprising:
   a shaft having opposite ends;
   a roller body surrounding the shaft and journaled for rotation around the shaft;
   the roller body including an end disc having a central aperture, the end disc forming one end of the roller body, the end disc surrounding the shaft, and the end disc including an outer roller end surface, the outer roller end surface including an annular coined surface surrounding the shaft concentrically, and spaced radially outwardly from said shaft;
   an outer seal member mounted on the shaft and the outer seal member including an outer peripheral edge, the outer peripheral edge of said outer seal member being positioned in closely spaced opposed relationship to said annular coined surface of the end disc and defining a narrow gap therebetween, and the outer seal including an inner end surface; and
   an inner seal member mounted to said end disc in said central aperture and adapted to rotate with said roller body relative to the shaft, the inner seal member including an outer end surface positioned in closely adjacent facing relation to the inner end surface of the outer seal member;
   said inner seal member being adapted to rotate relative to said outer seal member and said outer end surface and said inner end surface forming therebetween a labyrinth passageway extending from the interface between said outer peripheral edge and said annular coined surface to the interface between said inner seal member and the shaft.

2. An idler roller as set forth in claim 1 wherein one of the closely adjacent inner and outer end surfaces defines an annular groove and the other of the spaced part inner and outer end surfaces includes a first annular ring which projects outwardly from the other of the spaced apart end surfaces and which extends into the annular groove in the one of the spaced apart end surfaces.

3. An idler roller as set forth in claim 2 wherein one of the closely adjacent inner and outer end surfaces includes a second annular ring spaced radially outwardly from the first annular ring, and wherein the outer peripheral edge of the outer seal member is spaced radially outwardly of the second annular ring.

4. An idler roller comprising:
   a shaft having opposite ends;
   a roller body surrounding the shaft and journaled for rotation relative thereto, the roller body including an end disc having an annular coined surface radially spaced from and concentrically surrounding the shaft;
   an outer seal member having a tubular portion fixed to the shaft, an outer flange portion extending radially outwardly from the tubular portion, said outer flange portion and said annular coined surface defining therebetween an outer reservoir adapted to house therein a supply of lubricant, said outer flange portion including an outer peripheral edge positioned in closely-spaced, opposed relation to the coined region; and the outer seal member including an inner end surface; and
   an inner seal member surrounding the shaft and being mounted to the end disc and for rotation therewith relative to the shaft and to the outer seal member, the inner seal member including an inner end defining, with the tubular portion of the outer seal member, an inner reservoir adapted to house therein a supply of lubricant, the inner seal member including an outer end surface positioned in closely-spaced opposed relation to the inner end surface of the outer seal member, the inner end surface and the outer end surface forming therebetween a labyrinth passageway extending between the outer reservoir and the inner reservoir.

* * * * *

UNITED STATES PATENT AND TRADEMARK OFFICE
CERTIFICATE OF CORRECTION

PATENT NO. : 5,188,214
DATED : February 23, 1993
INVENTOR(S) : Russell H. C. Uttke and Edward J. Carney It is certified that error appears in the above-identified patent and that said Letters Patent is hereby corrected as shown below:

IN THE CLAIMS

Col. 8, line 9 delete the word "part" and insert --apart--.

Signed and Sealed this

Sixteenth Day of November, 1993

Attest:

BRUCE LEHMAN

Attesting Officer    Commissioner of Patents and Trademarks